United States Patent [19]

Pomikacsek

[11] Patent Number: 4,732,515

[45] Date of Patent: Mar. 22, 1988

[54] RAILROAD TRACKS MILLING METHOD AND APPARATUS

[75] Inventor: Josef Pomikacsek, Gmunden, Austria

[73] Assignee: Dr. Techn. E. Linsinger & Co Gesellschaft m.b.H., Steyrermühl, Austria

[21] Appl. No.: 924,450

[22] Filed: Oct. 29, 1986

[30] Foreign Application Priority Data

Oct. 29, 1985 [DE] Fed. Rep. of Germany ....... 3538345

[51] Int. Cl.⁴ .............................................. B23C 3/02
[52] U.S. Cl. .................................... 409/131; 51/73 R; 409/199
[58] Field of Search ............... 409/131, 132, 138, 139, 409/199, 200, 178; 51/73 R

[56] References Cited

U.S. PATENT DOCUMENTS

| | | | |
|---|---|---|---|
| 3,842,713 | 10/1974 | Hamilton | 409/132 |
| 4,326,323 | 4/1982 | Kralowetz et al. | 409/199 |
| 4,583,893 | 4/1986 | Liné | 409/138 |
| 4,624,610 | 11/1986 | Phillips et al. | 409/199 X |

FOREIGN PATENT DOCUMENTS

| | | | |
|---|---|---|---|
| 20811 | 2/1985 | Japan | 409/138 |
| 2056345 | 3/1981 | United Kingdom | 409/139 |
| 2134827 | 8/1984 | United Kingdom | 409/138 |

*Primary Examiner*—William R. Briggs
*Attorney, Agent, or Firm*—Browdy and Neimark

[57] ABSTRACT

For chip-removing machining of the contact surfaces of rails 1, a stationary system is used which to attain high machining output as well as good surface quality uses a rotating, internally toothed milling ring 2, the flight circle of which generates the normally elliptical contact surface profile of the rail 1, in a position inclined with respect to the longitudinal axis of the rail. To avoid reproducing the ridged defects 18 of the contact surface, at least one conical supporting roller 17 is used in the machining region, its elliptical contact arc being designed with a substantially longer radius of curvature than the amplitude length of the ridges.

9 Claims, 8 Drawing Figures

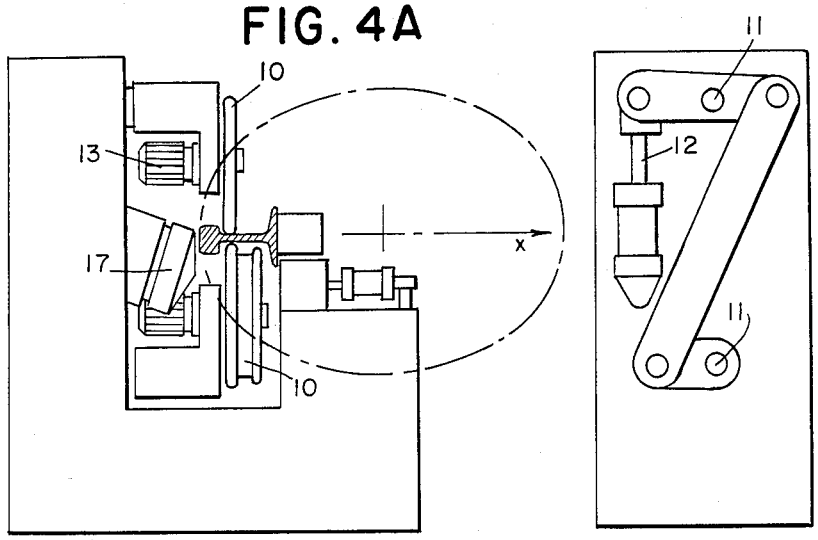
FIG. 4A
FIG. 4B
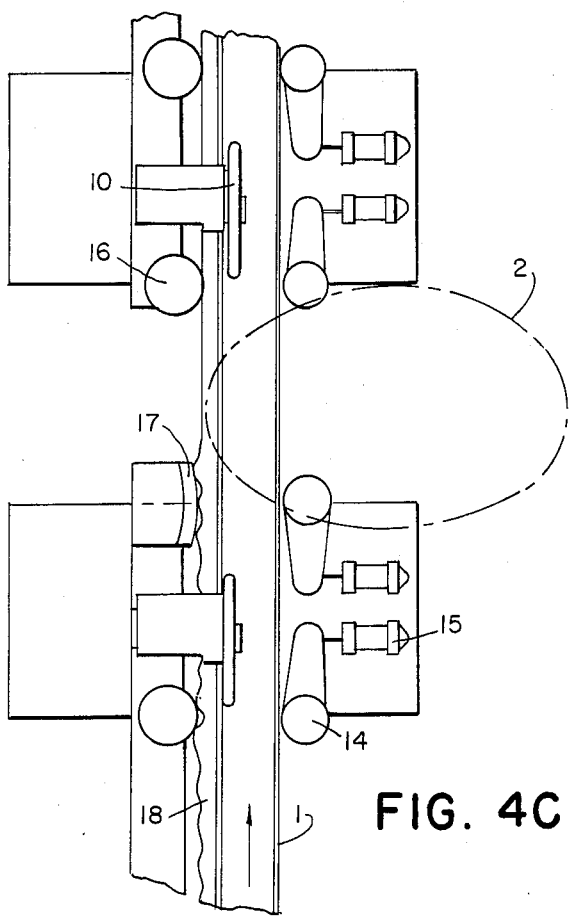
FIG. 4C

RAILROAD TRACKS MILLING METHOD AND APPARATUS

FIELD OF THE INVENTION

The present invention relates to a method and an apparatus for the working of the contact surfaces of railroad tracks by milling, wherein the tracks, i.e., rails, are moved longitudinally past a stationary milling unit, being guided by laterally arranged rollers.

BACKGROUND OF THE INVENTION

Working or machining of the contact faces of rails is often necessary. In this sense, substantially two types of applications may be involved, namely:
improvement of the surface quality in new rails, for example for high-speed routes, where the rolled quality is not sufficient; and
reprofiling used rails.

The contact surfaces of used rails have two defects resulting from plastic deformation, namely deformation of the cross section of the contact surface and the development of ridges in the longitudinal direction.

Both defects increase the driving resistance of the route, and the ridges play an important role. They appear together with cracks and have a self-inducing effect, which once the ridges have developed can lead to rail breakage within a relatively short time.

Various chip-removing techniques, such as planing, grinding and milling, are used for machining the contact surfaces.

Planing typically involves high costs for plant and tools; it also has an unfavorable effect in terms of machining, namely the production of continuous chips, which build up edges and thus negatively affect the surface quality.

With grinding, an equivalent surface quality is attainable, but for process-dictated reasons, only slight machining depths can be attained. Especially when such used rails are machined, this presents problems in terms of the time expended when the machining must be performed at least to the depth of the cracks. Test results indicate that eliminating the ridges by removal of material down to the depth of the lower flanks leads to the reappearance of the ridges after a short period of use. It is therefore desirable for the reprofiling to be performed at least to the depth of the cracks. The depths involved are up to 2 mm, and because of the order of magnitude of the machining volume, milling can be considered a highly suitable method. In the earlier known apparatus, profile millers arranged with vertical or horizontal shafts were used, which generate the profile either with a plurality of tangentially arranged tracks or with profile cutters. In both cases, tool costs are high, and imprecision in dimensions or positioning of the individual cutters often causes problems in the quality and profile accuracy of the worked surface.

SUMMARY OF THE INVENTION

It is the object of the invention to devise an improved milling method for working the contact surfaces of railroad rails, which not only enables low tool and operating costs but enables machining the rail contact surface down to a depth of approximately 2 mm with good surface quality and productivity. The invention also seeks to devise a milling apparatus for performing the method.

According to the invention this object is attained in a method of the above type substantially in that in the milling unit, a milling tool having a rotating milling ring with cutting elements disposed on its inside is used, and the flight circle of the cutters of the milling tool is aligned with respect to the rail in such a way that a diameter coincides with an axis of symmetry of the rail profile, and the cutter flight circle plane extends obliquely with respect to the longitudinal axis of the rail in such a way that the projection of the cutter flight circle into the rail profile plane that contains the rail profile axis of symmetry produces an ellipse, the course of which corresponds to the quasi-elliptical contact surface profile.

In accordance with an advantageous feature of the invention, a milling ring is used, the cutter flight circle radius of which is equal to one-half of the length of the longer axis of the ellipse defining the rail profile. To perform this method, an apparatus is proposed according to the invention in which the milling unit has a rotating milling ring with cutter elements disposed on its inside, the cutter flight circle plane of which is inclined in the direction of the longitudinal axis of the rail such that the projected reproduction of the cutter flight circle in the cross-section of the rail produces the particular contact surface profile.

In this apparatus, it is particularly suitable for the radius of the cutter flight circle of the milling ring to be equal to one-half the length of the longer axis of the ellipse defining the rail profile.

Advantageously, the angle of inclination of the cutter flight circle plane of the milling ring is also adjustable and fixable.

To attain high feeding speeds as well as good surface quality and good service life of the cutters, it is also advantageous for the machining of the rail surface to be done with an apparatus in which the milling is equipped with circular cutting plates of large dimension.

To prevent the propagation of the ridged defects on the contact surface and to take the ridging into account, at least one conical supporting roller is advantageously provided near the machining station for the rails moved in the direction of the longitudinal axis, the contact surface of the rail being pressed against the conical jacket of this roller, as a positioning basis, from the bottom of the rail by means of pressing rollers.

It is particularly advantageous for the radius of curvature of the elliptical contact curve of the conical supporting roller to be designed substantially larger than the amplitude length of the ridged defects on the contact surfaces of the rails.

DETAILED DESCRIPTION OF THE INVENTION

Details, characteristics and advantages of the invention will be explained in further detail, referring to the drawing, in conjunction with exemplary embodiments.

DESCRIPTION OF THE DRAWINGS

Shown are:
FIGS. 4A, 4B and 4C, a basic embodiment of a stationary milling system for machining the contact surfaces of rails.

As shown in FIG. 1, the contact surfaces of the rails 1 are typically profiled symmetrically with respect to the center axis having three different radii, such as R1, R2 and R3. The machining accuracy of region B often presents problems when the conventional profile milling method is used. The radii R1 and R2 are large radii, and depending on the type of rail the largest radius R2 may attain a length of 300 mm. According to the invention, machining of the rail contact surface in the region B, which is defined by R1 and R2, is performed with a rotating milling ring 2, the cutters of which are disposed on the inside.

FIG. 2 shows the axiometric disposition according to the invention of the flight circle of a rotating, internally toothed milling ring 2 when machining the contact surface of a rail 1. The X axis of the flight circle U of the milling ring 2 is disposed in the plane of symmetry of the rails 1. The Y axis is inclined in the direction V of the longitudinal axis of the rail 1 such that the projection Y', located in the normal plane of the rail cross section, of the flight circle U results in an ellipse such as to correspond with the contact surface profile. In this context, the contact surface arc shown in FIG. 1, located in the Y plane and defined by R1 and R2, will be considered to be quasi-elliptical. From this it is apparent that by pivoting the elliptical arc about the X axis in a predetermined plane, the result is a projected circular arc, which is located in the plane defined by the X and Y axis. The radius and the positioning location of the milling ring are designed in accordance with this circular arc.

FIG. 3 shows the basic embodiment of a milling unit for machining the contact surfaces of rails, having a rotating milling ring 2, the cutters of which are disposed on the end side. The milling ring 2 is mounted on a rotor 3, the position of which with respect to a stator 6 is determined by bearings 4 suitable for radial and axial positioning. The rotor 3 is driven by a motor 5. The rail 1 is disposed with its longitudinal axis preferably horizontally moveable, so that its axis of symmetry is located in the X axis of the milling ring 2. The plane of the milling ring 2 can be adjusted with respect to the rail profile by means of pivoting in the X axis, using a pivoting system 7. The desired location of the pivoting system 7 can be fixed with a securing element 9. The rail 1 has a freedom of movement indicated by an arrow. In other directions, the rail is guided by means of rollers, the exemplary embodiment of which will be explained in connection with FIG. 4. The machining depth can be adjusted with the relative change of position performed in the X axis. To this end, the subject of the invention shown is provided with a guide 8.

FIG. 4 shows the basic embodiment of a stationary milling system for machining the contact surfaces of rails, in three views.

Figure 1:
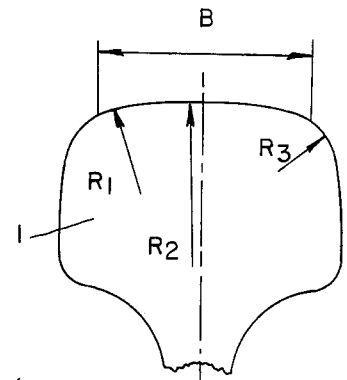
FIG. 1, a schematic illustration of the geometry of a rail contact surface.
Figure 2A:
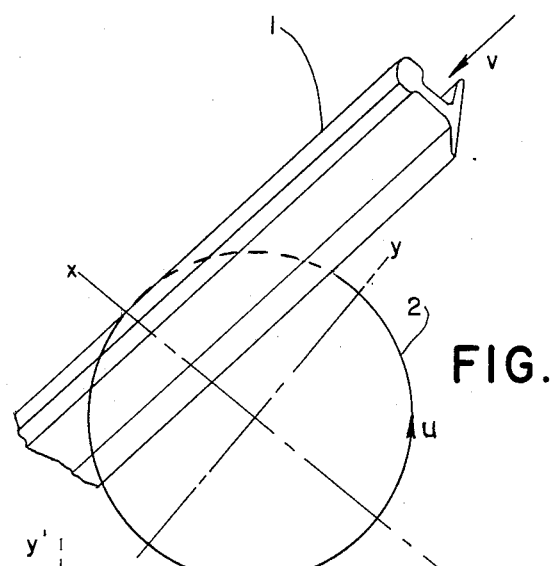
FIGS. 2A and 2B, a disposition of the flight circle of an internally toothed milling ring when a contact surface of a rail is being machined.
Figure 2B:
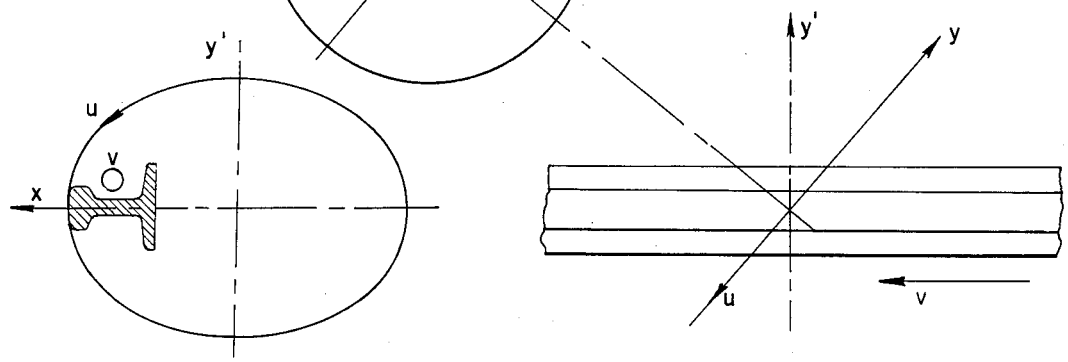
Figure 3A:
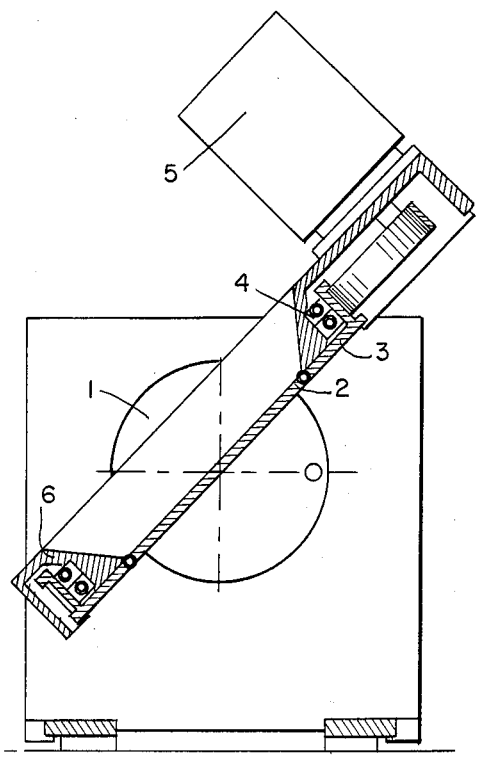
FIGS. 3A and 3B, a basic layout of a milling unit for machining the contact surfaces of rails, having a rotating milling ring, the cutters of which are disposed on the inside.
Figure 3B:
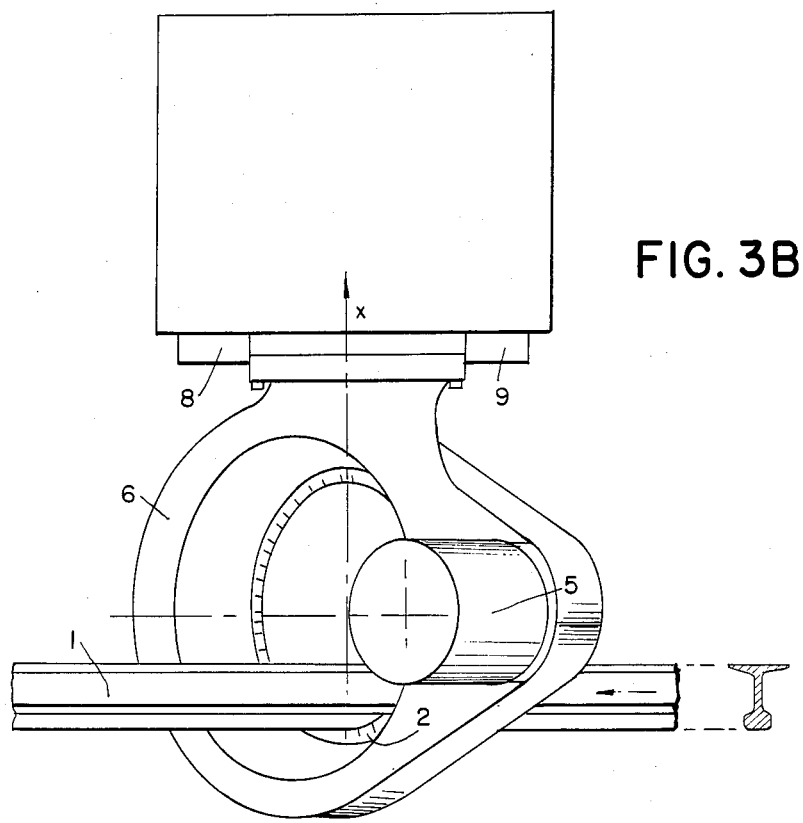

The milling ring 2 and the workpiece 1 are disposed with respect to one another as described in connection with FIG. 3. The basis for positioning for machining is the contact surface. The contact surface is defined before and after the machining station by supporting rollers 16 and 17. It is important that the ridged defects 18 present on the contact surface, which are shown in overproportional size in the drawing, not be copied during machining. In accordance with the invention, a conical supporting roller 17 is used prior to the machining region for this purpose, being disposed with its conical jacket toward the contact surface of the rail. By means of the elliptical contact region, it is possible for the points of contact to be created only on the uppermost tips of the ridges 18.

For pressing against the supporting rollers 16 and 17 used as a machining base, pressure rollers 14 acting upon the bottom of the rail are used. These rollers 14 may preferably be actuated by means of hydraulic cylinders 15. For positioning the axis of symmetry of the rail, centering rollers 10 are used, which in accordance with the exemplary embodiment are simultaneously also used for generating the feeding movement of the rail 1.

The centering rollers 10 are driven individually by motors 13. The diagram shows one exemplary embodiment, in which for symmetrical displacement of the centering rollers 10, a respective arm mechanism 11, actuated by means of hydraulic cylinders 12, is used. It is thereby made possible for the axis of symmetry of the rail 1 always to be guided at the level of the X axis.

The invention is not restricted to the exemplary embodiments shown and described; it also includes any modifications, improvements or simplifications, as well as partial combination and subcombination of the described and/or shown characteristics and provisions described and/or shown that are within the competence of one skilled in the art.

What is claimed is:

1. A method of working of the contact surfaces of rails of railroad tracks railroad tracks by milling, wherein the rails are moved in the longitudinal direction past a stationary milling unit and are guided by laterally disposed rollers, using the milling unit and a milling tool having a rotating ring with cutter elements disposed on the inside thereof, comprising aligning the cutter flight circle of the milling tool with respect to the rail such that one diameter of the circle of the milling tool coincides with an axis of symmetry of a rail profile, and extending the flight circle plane of the cutter obliquely with respect to the longitudinal axis of the rail in such a manner that the projection of the cutter flight circle into the rail profile plane containing the rail profile axis of symmetry produces an ellipse, the course of the ellipse corresponding to the quasi-elliptical contact surface profile.

2. The method of claim 1 wherein a milling ring is used, the cuter flight circle radium of the ring being equal to ½ the length of the longer ellipse axis of the ellipse defining the rail profile.

3. A milling apparatus for working contact surfaces of rails of of railroad tracks by milling comprising:
   a milling unit having a rotating milling ring with cutter elements disposed on the inside thereof;
   the cutter flight circle plane of the milling ring being inclined in the direction of the longitudinal axis of the rail in such a manner that the projected reproduction of the cutter flight circle in the cross-sectional plane of the rail produces the respective contact surface profile.

4. The apparatus of claim 3 wherein the radius of the cutter flight circle of the milling ring equals ½ the length of the longer ellipse axis of the ellipse defining the rail profile.

5. The apparatus of claim 4 wherein the angle of inclination of the cutter flight circle plane of the milling ring is adjustable and fixable.

6. The apparatus of claim 3 wherein the angle of inclination of the cutter flight circle plane of the milling ring is adjustable and fixable.

7. The apparatus of claim 3 wherein the milling ring further includes circular cutter plates of large dimension.

8. The apparatus of claim 3 further including at least one conical supporting roller, said conical supporting roller being located near the machining station of the rails; and
    pressing rollers pressing the contact surface of the rail against a conical jacket of the supporting roller.

9. The apparatus of claim 8 wherein the radius of curvature of an elliptical contact arc of the conical supporting roller is designed to be substantially larger than the amplitude length of ridged defects of the contact surfaces of the rails.

* * * * *